United States Patent [19]

Thomas

[11] Patent Number: 4,582,814
[45] Date of Patent: Apr. 15, 1986

[54] DIELECTRIC COMPOSITIONS
[75] Inventor: Gene L. Thomas, Glendale, Calif.
[73] Assignee: E. I. Du Pont de Nemours and Company, Wilmington, Del.
[21] Appl. No.: 713,099
[22] Filed: Mar. 18, 1985

Related U.S. Application Data

[63] Continuation-in-part of Ser. No. 628,146, Jul. 5, 1984, abandoned.

[51] Int. Cl.$^4$ .................. C04B 35/00; H01G 4/10
[52] U.S. Cl. .................. 501/136; 252/62.9; 252/572; 264/61; 501/134; 361/321
[58] Field of Search ............... 361/321; 252/62.9, 572; 501/102, 108, 134, 135, 136

[56] References Cited

U.S. PATENT DOCUMENTS

| | | | |
|---|---|---|---|
| 2,626,220 | 1/1953 | Thurnauer et al. | 106/39 |
| 2,908,579 | 10/1959 | Nelson et al. | 106/39 |
| 3,068,177 | 12/1962 | Sugden | 252/62.9 |
| 3,472,777 | 10/1969 | Brixner | 252/62.9 |
| 3,619,220 | 11/1971 | Maher | 106/39 |
| 3,638,084 | 1/1972 | Burn | 317/258 |
| 3,682,766 | 8/1972 | Maher | 161/196 |
| 3,717,487 | 2/1973 | Hurley et al. | 106/48 |
| 3,757,177 | 9/1973 | Buchler | 317/258 |
| 3,811,937 | 5/1974 | Maher | 117/217 |
| 3,872,360 | 3/1975 | Sheard | 317/258 |
| 4,048,546 | 9/1977 | Bouchard | 361/321 |
| 4,063,341 | 12/1977 | Bouchard | 361/321 |
| 4,104,698 | 8/1978 | Murata et al. | 361/321 |
| 4,219,866 | 8/1980 | Maner | 361/321 |
| 4,228,482 | 10/1980 | Bouchard | 361/321 |
| 4,230,589 | 10/1980 | Ogawa | 252/62.9 |
| 4,283,753 | 8/1981 | Burn | 361/321 |
| 4,339,544 | 7/1982 | Sakabe | 361/321 |

FOREIGN PATENT DOCUMENTS 2115400 9/1983 United Kingdom.

OTHER PUBLICATIONS

Chem. Abst. 91:26,086m, Didkovskaya, Apr. 11, 1979.
Chem. Abst. 95:191,413f, Fesenko, May 30, 1981.
N. N. Krainik et al., Soviet Physics–Solid State 2, 63–65, 1960.
G. A. Smolenskii et al., Soviet Physics–Solid State 3, 714–720, 1961.
Zaslavskii et al., Soviet Physics–Crystallography 7, 577–583, 1963.

*Primary Examiner*—Theodore Morris

[57] ABSTRACT

A composition for forming a densified dielectric body at low firing temperatures comprising a mixture of particles consisting essentially of (a) 95.5–99.4% finely divided wt. of a mixture of metal oxides, metal oxide precursors or polynary oxide reaction products thereof in molar proportions corresponding to the formula $$(Sr_xPb_{1-x}TiO_3)_a(PbMg_rW_sO_3)_b, \text{ and}$$

(b) 4.5–0.6% wt. of a mixture of metal oxides or precursors thereof consisting essentially of (1) a binary oxide of a transition metal selected from the group consisting of Co, Ni, Cr, Mn and mixtures thereof, (2) Cd titanate, Zn titanate or mixtures thereof, and (3) a polynary oxide selected from the group consisting of Cd zirconate, Zn zirconate, Cd stannate, Zn stannate and mixtures thereof.

12 Claims, No Drawings

DIELECTRIC COMPOSITIONS

This application is a continuation-in-part, of application Ser. No. 628,146 filed 07/05/84, now abandoned.

FIELD OF INVENTION

The invention relates to dielectric compositions and particularly to low-firing temperature dielectric compositions.

BACKGROUND OF THE INVENTION

Because of their high volumetric efficiency and thus their small size, multilayer ceramic capacitors (MLC's) are the most widely used form of ceramic capacitors. These capacitors are fabricated by stacking and cofiring thin sheets of ceramic dielectric on which an appropriate electrode pattern is printed. Each patterned layer is offset from the adjoining layers in such manner that the electrode layers are exposed alternately at each end of the assemblage. The exposed edges of the electrode pattern are coated with a conductive material which electrically connects all the layers of the structure, thus forming a group of parallel connected capacitors within the laminated structure. Capacitors of this type are frequently referred to as monolithic capacitors.

The thin sheets of ceramic dielectric used for the fabrication of MLC's are commonly referred to as "green tapes" and are comprised of a thin layer of finely divided dielectric particles which are bound together by an organic polymeric material. Unfired green tapes are prepared by slip casting a slurry of the dielectric particles dispersed in a solution of polymer, plasticizer and onto a carrier such as polypropylene, Mylar ® polyester film or stainless steel and then adjusting the thickness of the cast film by passing the cast slurry under a doctor blade.

Metallizations useful in producing conductors for multilayer capacitors normally comprise finely divided metal particles applied to green tape in the form of a dispersion of such particles in an inert liquid vehicle. Although the above-described "green tape" process is more widely used, there are nevertheless other procedures with which dielectric compositions of the invention can be used to make MLC's. One technique is the so called "wet process". In one aspect, this may involve passing a flat substrate through a falling sheet of dielectric slip one or more times to build up a dielectric layer (see Hurley et al., U.S. Pat. No. 3,717,487). Another way of carrying out the "wet process" is to brush a number of thin layers of dielectric slip onto a substrate to build up a thick dielectric layer (see Burn. U.S. Pat. No. 4,283,753).

Another method of making MLC's involves forming a paste of the dielectric material and then alternately screen printing the dielectric and metal layers with intervening drying steps until the designed structure is complete. A second electrode layer is then printed atop the dielectric layer(s) and the entire assemblage is cofired.

Monolithic multilayer capacitors are typically manufactured by cofiring barium titanate based formulations and conductive electrode materials in oxidizing atmospheres at temperatures of 1200°–1400° C. This process yields durable, well sintered capacitors with high dielectric constant, e.g., greater than 1000. However, firing under these conditions requires an electrode material with high melting point, good oxidation resistance at elevated temperatures, sinterability at the maturing temperature of the dielectric, and minimal tendency to interact with the dielectric at the sintering temperature. These requirements normally limit the choice of electrode materials to the noble metals platinum and palladium, or to alloys of platinum, palladium and gold. See also U.S. Pat. No. 3,872,360 to J. L. Sheard which is directed to the preparation of monolithic multilayer capacitors.

Significant savings in electrode costs could be realized if dielectric materials could be modified to (1) yield good dielectric properties (high dielectric constant and low dissipation factor) after firing in reducing atmospheres so that base metals could be used as electrodes and/or (2) sinter at temperatures of 950° C. or lower so that silver, which is significantly less costly than the other noble metals but has a lower melting point (962° C.), could be used in electrode formation.

Attempts have been made to modify barium titanate ceramics so that they may be fired in reducing (e.g. hydrogen) or inert (e.g. argon, nitrogen) atmospheres. The use of this approach has been somewhat limited in that the electrical properties, e.g., dielectric constant, dissipation factor, temperature coefficient of capacitance, etc., are compromised as compared with those of conventional air-fired compositions. In addition, maintaining an inert or reducing atmosphere involves an additional production cost as compared to firing in air. Exemplary of this approach is Buehler, U.S. Pat. No. 3,757,177, disclosing capacitors of base metal electrodes (e.g., Ni, Co, Fe) and modified barium titanate ($MnO_2$, $Fe_2O_3$, $CoO_2$, $CaZrO_3$) fired in an inert atmosphere about 1300° C. (col. 3, lines 33-34).

Several attempts have been made to reduce the maturing temperature of dielectrics by mixing high temperature ferroelectric phases (titanates, zirconates, etc.) with glasses which mature at relatively low temperatures. Examples of this approach are given in Maher U.S. Pat. No. 3,619,220, Burn U.S. Pat. No. 3,638,084. Maher U.S. Pat. No. 3,682,766, and Maher U.S. Pat. No. 3,811,937. The drawback of this technique is that the dilution effect of the glass often causes the dielectric constant of the mixture to be relatively low.

Another technique for lowering the sintering temperature of titanate-based dielectrics is by the use of "sintering aids". Additions of bismuth oxide or bentonite to barium titanate lowers the maturing temperature to about 1200° C. (Nelson et al. U.S. Pat. No. 2,908,579). Maturing temperatures of 1200°–1290° C. may be attained by addition of phosphates to titanates as described in Thurnauer et al. U.S. Pat. No. 2,626,220. However, in each of these cases, the decrease in maturing temperature is not sufficient to permit the use of cofired silver electrodes, and dielectric properties are often degraded.

There existed a need for a composition which would produce a high dielectric constant (e.g., 1000 or above) and low dissipation factor (e.g., less than 5%, preferably less than 2%) and sinters in air at low temperatures (e.g., less than 1000° C. or less). This would permit cofiring with silver or palladium/silver electrodes and hence would greatly reduce the cost of high dielectric constant multilayer capacitors.

N. N. Krainik et al. (Soviet Physics-Solid State 2, 63-65, 1960) report solid solutions between, inter alia, $PbTiO_3$ and $PbMg_{0.5}W_{0.5}O_3$. Apparently a wide range of compositions with 0–80% $PbTiO_3$ was investigated (see FIG. 2). No suggestion was made as to the manufacture of multilayer capacitors. In a second article from the same laboratory, G. A. Smolenskii et al. (Soviet Physics-Solid State 3, 714, 1961) report investigating certain solid solutions, including those of Krainik et al. Firing was similarly done in a PbO vapor atmosphere. Phase transitions are discussed. In what is apparently a third article in this series, A. I. Zaslavskii et al. (Soviet Physics-Crystallography 7, 577, 1963), X-ray structural studies are reported.

Brixner U.S. Pat. No. 3,472,777 discloses the manufacture of ferroelectric ceramic disks by a two-step firing process. Each firing step is taught to occur in the range 800°–1200° C. in air. In the sole example, firing was at 1050° C. Brixner discloses various dielectric compositions such as $PbMg_{1/3}Ti_{1/3}W_{1/3}O_3$ and Y-containing compositions.

More recently, Bouchard has very successfully approached the problem of dielectric compositions having low firing temperatures and dielectric constants as high as 6000 for use in Z5U-type capacitors. These substituted lead titanate compositions correspond to the following formula:

$(Sr_xPb_{1-x}TiO_3)_a(PbMg_rW_sO_3)_b$, wherein

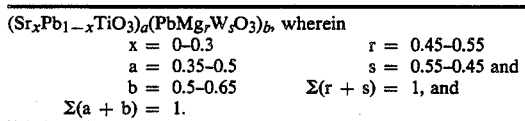

Such materials are disclosed in U.S. Pat. Nos. 4,048,546, 4,063,341, and 4,228,482, all to Bouchard. More recently, U.K. Patent Application No. 2,115,400A discloses quite similar compositions which have low sintering temperatures corresponding to the formula:

$PbTi_{1-x-y}Mg_xW_yO_3$,

in which x and y range from 0.25 to 0.35. These materials are made by mixing the corresponding metal oxides and calcining the mixture at 700°–750° C. The materials are sintered at 800°–950° C. which is below the melting point of silver. Some of the compositions of the U.K. application are identical in composition to those of Bouchard and are therefore expected to have the same properties.

Notwithstanding the substantial progress in attaining higher dielectric constants, the electronics industry foresees the need for dielectric compositions having still higher dielectric constants (K) on the order of 8000 and even higher, which nevertheless can still used with conventional silver-containing electrodes such as 85/15 and 70/30 palladium/silver electrodes.

BRIEF DESCRIPTION OF THE INVENTION

In view of the steadily more stringent requirements of the electronics industry for improved tape dielectrics, the invention is directed to lead titanate-based dielectric compositions suitable for Z5U-type service having dielectric constants of 8000 and even higher.

More particularly, the invention is directed in its primary aspect to a composition for forming a densified dielectric body at low firing temperatures comprising a mixture of finely divided particles consisting essentially of:

(a) 95.5–99.4% wt. of a mixture of metal oxides, metal oxide precursors of polynary oxide reaction products thereof in molar proportions corresponding to the formula:

$(Sr_xPb_{1-x}TiO_3)_a(PbMg_rW_sO_3)_b$, in which

-continued

| | |
|---|---|
| x = 0–0.3 | r = 0.45–0.55 |
| a = 0.45–0.6 | s = 0.55–0.45 and |
| b = 1.55–0.4 and | Σ(r + s) = 1, and |
| Σ(a + b) = 1. | |

(b) 4.5–0.6% wt. of a mixture of metal oxides or precursors thereof consisting essentially of (1) 0.1–1.0% wt. of a binary oxide of a transition metal selected from the group consisting of Co, Ni, Cr, Mn and mixtures thereof, (2) 0.25–1.5% wt. of Cd titanate, Zn titanate or mixtures thereof, and (3) 0.25–2.0% wt. of a polynary oxide selected from the group consisting of Cd zirconate, Zn zirconate, Cd stannate, Zn stannate and mixtures thereof, substantially all the particles being less than 10 μm in largest dimension.

In a second aspect, the invention is directed to a tape casting composition comprising the above-described dielectric composition dispersed in a solution of binder polymer in a volatile nonaqueous solvent.

In a third aspect, the invention is directed to a method of forming green tape by casting a thin layer of the above-described dispersion onto a flexible substrate, such as a steel belt or polymeric film, and heating the cast layer to remove the volatile solvent therefrom.

In a fourth aspect, the invention is directed to capacitors made by laminating and cofiring a plurality of the above-described green tape layers on which an appropriate electrode pattern has been printed in an offset manner such that the edges of the printed electrodes from alternating layers are exposed at opposite ends of the laminated structure and the exposed ends of the patterned electrodes are each connected electrically by means of a conductive coating thereon.

In a fifth aspect, the invention is directed to screen-printable thick film compositions comprising the above-described dielectric composition dispersed in organic medium.

DETAILED DESCRIPTION OF THE INVENTION

A. Inorganic Component

As suggested by the foregoing formula, when the compositions of the invention are fired, they become substantially solid solutions in which the compounds of (a) are doped with very small amounts of the transition metal oxide(s) and zirconates and stannates of (b). However, prior to firing, the compositions may be comprised of the separate oxides or of solid solutions or compounds of two or more oxides, depending upon the degree of calcining which the ingredients may have received.

Though calcining is not absolutely essential, it will be recognized that it is much preferred that at least most of the above-described mixture of particles be calcined in air in order that shrinkage upon firing can be minimized. However, the degree of calcination will depend in large part upon the particular application and upon the severity of firing which is used to effect formation of sintered dielectric bodies. Obviously, more severe firing will tend to reduce the number of phases present and the composition will approach a single solid solution state. It is preferred that at least the components of (a) be calcined in air. Suitable calcining conditions are 1000°–1500° F. (538°–816° C.), and especially 1300°–1500° F. (704°–816° C.). Calcination time should be at least 0.5 hour and preferably at least 1.0 hour. Two hours calcination time has been found to be adequate though longer times may be used. The components need not be calcined all together; they can be calcined separately as well.

The compositions may be in the form of the metal oxides, precursors of the metal oxides and/or of reaction products of the metal oxides of the above indicated metals. By the term "precursors of metal oxides" is meant compounds which upon calcining or firing are converted to metal oxides. These include carbonates, hydroxides and nitrates. For example, upon calcining, $MgCo_3$ is converted to MgO and thus $MgCo_3$ is a precursor of MgO. By the term "reaction product" is meant a compound or solid solution of the metal oxide which may be formed from the metal oxides. For example, the polynary oxide $PbTiO_3$ can be formed from PbO and $TiO_2$ by firing. Thus, the Pb and Ti component can be added to the composition separately as PbO and $TiO_2$ or as already formed $PbTiO_3$.

In general, the compositions are made by the following steps:
 (1) Wet milling the dispersion (mixing)
 (2) Removing the water (drying)
 (3) Granulating
 (4) Calcining
 (5) Granulating
 (6) Wet milling (particle size adjustment)

However, these steps are not necessarily in the same sequence for each component. For example, it may be preferred to premix the transition metal oxide with a single component of (a) such as $PbTiO_3$, which undergoes steps (1) through (5). This premix is then added to the other components of (a) which undergo steps (1) through (6) plus drying and granulating. To the resultant granulated admixtures are added the rest of the components of (b) and the final admixture is milled, dried and granulated. In this procedure, which is designed to obtain more uniform mixing of all components, the transition metal components are calcined twice, but the polynary oxides not at all. Whatever scheme of mixing is used, quite uniform distribution of all the components is essential and the extent to which calcining is needed will be determined by the allowable degree of shrinkage when the mixture is fired. As used hereinabove, the term "granulating" refers to the use of vibratory screens to break up agglomerated particles. This is usually done just prior to calcining.

To obtain even better burnout and sintering characteristics, it is preferred that the surface area of the dielectric particles be at least 0.5 $m^2/g$ and preferably at least 5 $m^2/g$. Still higher particle surface areas, e.g., 10 $m^2/g$ or higher, can be used, but their benefit must be balanced against the fact that higher surface area particles require more organic medium to obtain a given dispersion viscosity. In addition, substantially all of the particles should be less than 10 μm in their largest dimension.

B. Green Tape Casting Solution

As mentioned above, green tapes of the dielectric composition of the invention are made by casting a dispersion of the dielectric material in a solution of polymeric binder and volatile organic solvent onto a flexible substrate, such as a steel belt or polymeric film, and then heating the cast layer to remove the volatile solvent therefrom.

The organic medium in which the ceramic solids are dispersed consists of the polymeric binder which is dissolved in a volatile organic solvent and, optionally, other dissolved materials such as plasticizers, release agents, dispersing agents, stripping agents, antifouling agents and wetting agents.

To obtain better binding efficiency, it is preferred to use at least 5% vol. polymer binder for 90% vol. ceramic solids. However, it is further preferred to use no more than 20% vol. polymer binder in 80% vol. ceramic solids. Within these limits, it is desirable to use the least possible amount of binder vis-a-vis solids in order to reduce the amount of organics which must be removed by pyrolysis.

In the past, various polymeric materials have been employed as the binder for green tapes, e.g., poly(vinyl butyral), poly(vinyl acetate), poly(vinyl alcohol), cellulosic polymers such as methyl cellulose, ethyl cellulose, hydroxyethyl cellulose, methylhydroxyethyl cellulose, atactic polypropylene, polyethylene, silicon polymers such as poly(methyl siloxane), poly(methylphenyl siloxane), polystyrene, butadiene/styrene copolymer, polystyrene, poly(vinyl pyrollidone), polyamides, high molecular weight polyethers, copolymers of ethylene oxide and propylene oxide, polyacrylamides, and various acrylic polymers such as sodium polyacrylate, poly(lower alkyl acrylates), poly(lower alkyl methacrylates) and various copolymers and multipolymers of lower alkyl acrylates and methacrylates. Copolymers of ethyl methacrylate and methyl acrylate and terpolymers of ethyl acrylate, methyl methacrylate and methacrylic acid have been previously used as binders for slip casting materials.

More recently, Usala, in U.S. patent application Ser. No. 501,978, filed June 7, 1983, has disclosed an organic binder which is a mixture of compatible multipolymers of 0–100% wt. $C_{1-8}$ alkyl methacrylate, 100–0% wt. $C_{1-8}$ alkyl acrylate and 0–5% wt. ethylenically unsaturated carboxylic acid or amine. Because the polymers permit the use of minimum amounts of binder and maximum amounts of dielectric solids, their use is preferred with the dielectric composition of this invention. For this reason, the disclosure of the above-referred Usala application is incorporated by reference herein.

The solvent component of the casting solution is chosen so as to obtain complete solution of the polymer and sufficiently high volatility to enable the solvent to be evaporated from the dispersion by the application of relatively low levels of heat at atmospheric pressure. In addition, the solvent must boil well below the boiling point and decomposition temperature of any other additives contained in the organic medium. Thus, solvents having atmospheric boiling points below 150° C. are used most frequently. Such solvents include benzene, acetone, xylene, methanol, ethanol, methyl ethyl ketone, 1,1,1-trichloroethane, tetrachloroethylene, amyl acetate 2,2,4-triethyl pentanediol-1,3-monoisobutyrate, toluene and methylene chloride.

Frequently, the organic medium will also contain a small amount, relative to the binder polymer, of a plasticizer which serves to lower the glass transition temperature (Tg) of the binder polymer. However, the use of such materials should be minimized in order to reduce the amount of organic materials which must be removed when the films cast therefrom are fired. The choice of plasticizers is, of course, determined primarily by the polymer which must be modified. Among the plasticizers which have been used in various binder systems are diethyl phthalate, dibutyl phthalate, octyl phthalate, butyl benzyl phthalate, alkyl phosphates, polyalkylene glycols, glycerol, poly(ethylene oxides), hydroxyethylated alkyl phenol, dialkyldithiophosphonate and poly(isobutylene). Of these, butyl benzyl phthalate is most frequently used in acrylic polymer systems because it can be used effectively in relatively small concentrations.

C. Thick Film Paste

Often it may be desired to apply the compositions of the invention as a thick film paste by such techniques as screen printing. When the dispersion is to be applied as a thick film paste, conventional thick film organic media can be used with appropriate rheological adjustments and the use of lower volatility solvents. In this event, the compositions must have appropriate viscosity so that they can be passed through the screen readily. In addition, they should be thixotropic in order that they set up rapidly after being screened, thereby giving good resolution. While the rheological properties are of primary importance, the organic medium is preferably formulated also to give appropriate wettability of the solids and the substrate, good drying rate, dried film strength sufficient to withstand rough handling and good firing properties. Satisfactory appearance of the fired composition is also important.

In view of all these criteria, a wide variety of inert liquids can be used as organic medium. The organic medium for most thick film compositions is typically a solution of resin in a solvent and, frequently, a solvent solution containing both resin and thixotropic agent. The solvent usually boils within the range of 130°–350° C.

Especially suitable resins for this purpose are polymethacrylates of lower alcohols and monobutyl ether of ethylene glycol monoacetate.

The most widely used solvents for thick film applications are terpenes such as alpha- or beta-terpineol or mixtures thereof with other solvents such as kerosene, dibutylphthalate, butyl carbitol, butyl carbitol acetate, hexylene glycol and high boiling alcohols and alcohol esters. Various combinations of these and other solvents are formulated to obtain the desired viscosity and volatility requirements for each application.

Among the thixotropic agents which are commonly used are hydrogenated castor oil and derivatives thereof. It is, of course, not always necessary to incorporate a thixotropic agent since the solvent/resin properties coupled with the shear thinning inherent in any suspension may alone be suitable in this regard.

The ratio of organic medium to inorganic solids in the dispersions can vary considerably and depends upon the manner in which the dispersion is to be applied and the kind of organic medium used. Normally, to achieve good coverage, the dispersions will contain complementary by weight 60–90% solids and 40–10% organic medium. Such dispersions are usually of semifluid consistency and are referred to commonly as "pastes".

The pastes are conveniently prepared on a three-roll mill. The viscosity of the pastes is typically within the following ranges when measured at room temperature on Brookfield viscometers at low, moderate and high shear rates:

| Shear Rate (Sec$^{-1}$) | Viscosity (Pa · s) | |
|---|---|---|
| 0.2 | 100–5000 | — |
| | 300–2000 | Preferred |
| | 600–1500 | Most preferred |
| 4 | 40–400 | — |
| | 100–250 | Preferred |
| | 140–200 | Most preferred |
| 384 | 7–40 | — |
| | 10–25 | Preferred |
| | 12–18 | Most preferred |

The amount and type of organic medium (vehicle) utilized is determined mainly by the final desired formulation viscosity and print thickness.

D. Capacity Processing

As described above, many multilayer capacitors are fabricated by printing on electrode metallization in the desired pattern upon a dielectric substrate which is a green tape. The printed dielectric substrates are stacked, laminated and cut to form the desired capacitor structures. The green dielectric material is then fired to effect removal of the organic medium from the electrode material and of the organic binder from the dielectric material. The removal of these materials is accomplished by a combination of evaporation and thermal decomposition during the firing operation. In some instances it may also be desirable to interpose a preliminary drying step prior to firing. The thickness of the unfired green tape is typically about 1.2–1.3 mils and upon firing the thickness becomes about 0.9–1.0 mil.

When firing the above-described capacitor assemblages, it is preferred to employ a first firing step in which the assemblage is heated slowly to 100°–550° C., which will be effective to remove all of the organic material without damage to the laminated assemblage. Typically the organic burnout period is 18–24 hours to assure complete removal of organics. When this has been completed, the assemblage is then heated more rapidly to the desired sintering temperature.

The desired sintering temperature is determined by the physical and chemical characteristics of the dielectric material. Ordinarily the sintering temperature will be chosen to obtain maximum densification of the dielectric material. For the dielectric compositions of this invention, the temperature will range from 900° to 1050° C. However, it will be recognized by those skilled in the art of fabricating capacitors that maximum densification is not always needed. Therefore, the term "sintering temperature" refers to the temperature (and implicitly the amount of time as well) to obtain the desired degree of densification of the dielectric material for the particular capacitor application. Sintering times also vary with the dielectric composition but ordinarily on the order of two hours at the sintering temperature is preferred.

Upon completion of sintering, the rate of cooling to ambient temperature is carefully controlled in accordance with resistance of the components to thermal shock.

The following properties which are relevant to the ability of a given capacitor to function properly are referred to in the examples.

E. Capacitance

Capacitance is a measure of the capability of a material to store an electrical charge expressed mathematically, C=KAN divided by t, where K is dielectric constant, A equals area overlap of electrodes, N is number of dielectric layers, and t is thickness of dielectric layer.

The units of capacitance are farads or fractions thereof such as microfarads ($10^{-6}$ farad), nanofarads ($10^{-9}$ farad) or picrofarads ($10^{-12}$ farad).

F. Dissipation Factor

Dissipation Factor (DF) is a measure of the phase difference between voltage and current. In a perfect capacitor the phase difference would be 90°. However, in practical dielectric systems, this phase difference is less than 90° by an amount $\sigma$ because of leakage and relaxation losses. In particular, DF is the tangent of the angle $\sigma$.

G. Insulation Resistance

Insulation Resistance (IR) is a measure of the ability of a charged capacitor to withstand leakage in DC current. Insulation resistance is a constant for any given dielectric regardless of capacitance.

The following examples and comparative showings are presented to illustrate the advantage of the present invention. In the examples and elsewhere in the specification and claims, all parts, percentages, proportions, etc., are by weight, unless otherwise stated.

EXAMPLES

Examples 1-5

Two quantities of low-fire dielectric compositions were made in which the ratio of a to b was 0.40/0.60 and 0.50/0.50 by the following sequence of processing steps:
(1) Wet milling
(2) Drying
(3) Granulating
(4) Calcining
(5) Granulating
(6) Resin Milling The term "resin milling" refers to milling which is conducted using an organic dispersion medium in place of water. The organic medium is a solution of the binder polymer in organic solvent.

Three further quantities of dielectric composition having intermediate a/b ratios were prepared by blending appropriate portions of the two above-described materials. The resulting five compositions were then used in the manner described above to form green tapes which, in turn, were used to fabricate multilayer capacitors which differed only in the composition of the dielectric material used. The electrical properties of the capacitors formed therefrom are given in Table 1 below:

TABLE 1
EFFECT ON DIELECTRIC CONTENT OF CHANGING RATIO OF a TO b

| | Example No. | | | | |
|---|---|---|---|---|---|
| Dielectric Composition | 1 | 2 | 3 | 4 | 5 |
| | (% weight) | | | | |
| PbO | 63.1 | 63.4 | 63.8 | 64.3 | 64.7 |
| $MgCO_3$ | 8.1 | 7.8 | 7.5 | 7.2 | 6.9 |
| $TiO_2$ | 9.1 | 9.8 | 10.4 | 11.0 | 11.6 |
| $WO_3$ | 19.7 | 19.0 | 18.3 | 17.5 | 16.8 |
| | (mole %) | | | | |
| $PbTiO_3$ | 38.6 | 41.0 | 43.5 | 45.9 | 48.3 |
| $Pb(MgW)O_3$ | 57.7 | 55.4 | 53.0 | 50.7 | 48.3 |
| MgO | 3.7 | 3.6 | 3.5 | 3.4 | 3.4 |

TABLE 1-continued
EFFECT ON DIELECTRIC CONTENT OF CHANGING RATIO OF a TO b

| | Example No. | | | | |
|---|---|---|---|---|---|
| | 1 | 2 | 3 | 4 | 5 |
| Firing Temperature, °C. | 1038 | 1038 | 1038 | 1038 | 1038 |
| Fired Dielectric Properties | | | | | |
| K at 25° C. | 5437 | 6140 | 7004 | 7610 | 5790 |
| TCC, % $\Delta C$, | | | | | |
| 10° C. | +4.0 | +2.8 | −10.9 | −16.4 | −25.5 |
| 35° C. | −4.6 | −2.8 | +2.0 | +15.5 | +31.9 |
| 50° C. | −13.0 | −9.9 | −4.1 | +24.7 | +71.3 |
| 85° C. | −30.2 | −23.7 | −24.1 | +12.7 | +131.3[1] |
| % DF (1V/mil) | 1.07 | 1.74 | 5.36 | 6.91 | 4.90 |
| x | 1 | 1 | 1 | 1 | 1 |
| a | 0.40 | 0.425 | 0.45 | 0.475 | 0.50 |
| b | 0.60 | 0.575 | 0.55 | 0.525 | 0.50 |

[1]Based $K_{25°\ C.}$ and $TCC_{85°\ C.}$, potential K is 13,000.

The foregoing data show that a substantial effect on all of the tested properties was obtained. As the Curie peak is shifted to higher temperatures with the increase in a/b ratio, the values of K and DF at room temperature, not surprisingly, increase. These data show that a very high potential room temperature K value can be obtained with the invention.

Examples 6-8

Two quantities of low-fire dielectric compositions were prepared in which the amount of $ZnTiO_3$ was zero and 1.0% wt.

First, a premixture of $MnO_2$, CoO and $PbTiO_3$ was prepared by ball-milling those components in 55% water. The ball-milled mixture was then dried at 450° C. for 12 hours, granulated through a 40-mesh screen, calcined at 1350° C. for 2 hours and then granulated once again. The remaining components were then prepared by the following sequence:
(1) Wet milling
(2) Drying
(3) Granulating
(4) Calcining
(5) Granulating
(6) Resin Milling Mixtures with and without $ZnTiO_3$ were prepared, portions of which were blended to form an admixture having an intermediate amount of $ZnTiO_3$.

The milled dispersion of the composition solids in the acrylic polymer solution was then used to cast a green tape from which multilayer capacitors were prepared in the manner described above. The electrical properties of the capacitors formed therefrom are given in Table 2 below.

TABLE 2
EFFECT ON FIRING RANGE OF $ZnTiO_3$ ADDITION

| | Example No. | | |
|---|---|---|---|
| Dielectric Composition | 6 | 7 | 8 |
| | (% Weight) | | |
| PbO | 64.3 | 63.9 | 63.6 |
| $MgCO_3$ | 7.1 | 7.0 | 7.0 |
| $TiO_2$ | 11.1 | 11.1 | 11.0 |
| $WO_3$ | 17.2 | 17.2 | 17.1 |
| CoO | 0.2 | 0.2 | 0.2 |
| MnO | 0.1 | 0.1 | 0.1 |
| $ZnTiO_3$ | — | 0.5 | 1.0 |
| Acceptable Sintering at 1038° C. | No | Yes | Yes |

TABLE 2-continued
EFFECT ON FIRING RANGE OF ZnTiO$_3$ ADDITION

| | Example No. | | |
|---|---|---|---|
| | 6 | 7 | 8 |
| at 1010° C. | No | Yes | Yes |
| at 982° C. | No | No | Yes |

The data in Table 2 show that the addition of quite small amounts of ZnTiO$_3$ was effective to lower the sintering temperature of the dielectric composition by at least 50° C.

Examples 9–16

A series of eight compositions was prepared in which various amounts and kinds of doping agents were added to the composition of the invention to observe their effect on fired dielectric properties, particularly dissipation factor (DF). The compositions were prepared by the following sequence of steps, except that for Examples 9–11 and 16 the SrTiO$_3$ and/or ZnTiO$_3$ were added to the mixture following the calcining operation:

(1) Wet milling
(2) Drying
(3) Granulating
(4) Calcining
(5) Granulating
(6) Resin milling The resin-milled dispersion of the composition solids in the solution of acrylic polymer was then used to cast a green tape from which multilayer capacitors were prepared in the manner described above. The electrical properties of the capacitors formed therefrom are given in Table 3 below:

TABLE 3
EFFECT ON DISSIPATION FACTOR (DF) OF ADDING METAL OXIDE DOPANTS

| | Example No. | | | |
|---|---|---|---|---|
| | 9 | 10 | 11 | 12 |
| Dielectric Composition | (% weight) | | | |
| PbO | 62.6 | 62.6 | 61.6 | 61.6 |
| MgCO$_3$ | 6.6 | 6.7 | 6.6 | 6.6 |
| TiO$_2$ | 11.5 | 11.4 | 11.2 | 11.2 |
| WO$_3$ | 16.0 | 16.3 | 16.0 | 16.0 |
| CoO | 0.2 | — | — | — |
| MnO$_2$ | 0.1 | — | 0.2 | — |
| NiO | — | — | — | — |
| CeO$_2$ | — | — | — | 0.2 |
| Fe$_2$O$_3$ | — | — | — | — |
| SrTiO$_3$ | — | — | 4.0 | 4.0 |
| ZnTiO$_3$ | — | — | 0.5 | 0.5 |
| Firing Temperature, °C. | 1024 | 1024 | 1024 | 1024 |
| Fired Dielectric Properties | | | | |
| K at 25° C. | 9176 | 8993 | 6674 | 6089 |
| % DF (1V/mil) | 0.63 | 1.50 | 0.28 | 0.99 |
| IR(ΩF) | | | | |
| at 25° C. | 30K | 21K | 2K | 3.2K |
| at 85° C. | 9.7K | 6.7K | 1.4K | 2.5K |

| | Example No. | | | |
|---|---|---|---|---|
| | 13 | 14 | 15 | 16 |
| Dielectric Composition | (% weight) | | | |
| PbO | 61.6 | 61.6 | 61.6 | 61.7 |
| MgCO$_3$ | 6.6 | 6.6 | 6.6 | 6.6 |
| TiO$_2$ | 11.2 | 11.2 | 11.2 | 11.2 |
| WO$_3$ | 16.0 | 16.0 | 16.0 | 16.0 |
| CoO | — | 0.2 | — | — |
| MnO$_2$ | — | — | — | — |
| NiO | 0.2 | — | — | — |
| CeO$_2$ | — | — | — | — |
| Fe$_2$O$_3$ | — | — | 0.2 | — |
| SrTiO$_3$ | 4.0 | 4.0 | 4.0 | — |
| ZnTiO$_3$ | 0.5 | 0.5 | 0.5 | — |
| Firing Temperature, °C. | 1024 | 1024 | 1024 | 1024 |
| Fired Dielectric Properties | | | | |
| K at 25° C. | 7878 | 9182 | 7670 | 9187 |
| % DF (1V/mil) | 1.80 | 0.76 | 3.88 | 2.43 |
| IR(ΩF) | | | | |
| at 25° C. | 1K | 0.3K | 0.3K | 0.3K |
| at 85° C. | 2.5K | 4.2K | 0.2K | 2.7K |

Comparison of Examples 9 and 10 shows that CoO and MnO$_2$ were together effective to lower DF. Likewise the addition of CoO alone (Example 14) resulted in a quite low DF value. Examples 11–13 show that the addition of MnO$_2$, CeO$_2$ and NiO are each effective to lower DF. However, comparison of Example 15 with the control Example 16 showed that Fe$_2$O$_3$ did not lower DF, but raised it.

Examples 17–20

Two pairs of composition were prepared to observe the effect of adding CdSnO$_3$ on life performance. The compositions were prepared by the following sequence of steps, except that starting with SrTiO$_3$, ZnTiO$_3$ and CdSnO$_3$ were added to the calcined products of step (4):

(1) Wet milling
(2) Drying
(3) Granulating
(4) Calcining
(5) Granulating
(6) Wet milling
(7) Drying
(8) Granulating
(9) Resin milling The resin-milled dispersion of the composition solids in the solution of acrylic polymer were then used to cast a green tape from which multilayer capacitors were prepared in the manner described above. The electrical properties of the capacitors formed therefrom are given in Table 4 below:

TABLE 4
EFFECT OF CdSnO$_3$ ADDITIONS ON LIFE PERFORMANCE

| | Example No. | | | |
|---|---|---|---|---|
| | 17 | 18 | 19 | 20 |
| Dielectric Composition | (% by weight) | | | |
| PbO | 62.0 | 61.4 | 62.0 | 61.4 |
| MgCO$_3$ | 6.5 | 6.4 | 6.5 | 6.4 |
| TiO$_2$ | 11.4 | 11.3 | 11.4 | 11.3 |
| WO$_3$ | 15.8 | 15.6 | 15.8 | 15.6 |
| CoO | 0.2 | 0.2 | 0.2 | 0.2 |
| MnO$_2$ | 0.1 | 0.1 | 0.1 | 0.1 |
| SrTiO$_3$ | 3.5 | 3.5 | 3.5 | 3.5 |
| ZnTiO$_3$ | 0.5 | 0.5 | 0.5 | 0.5 |
| CdSnO$_3$ | — | 1.0 | — | 1.0 |
| Powder Properties | | | | |
| Particle size, μm | | | | |
| 10% | <0.95 | <0.92 | <0.95 | <0.92 |
| 50% | <1.80 | <1.60 | <1.80 | <1.60 |
| 90% | <3.45 | <2.70 | <3.45 | <2.70 |
| Surface Area, m$^2$g | 5.7[1] | 6.7[2] | 5.7 | 6.7[2] |
| Firing Temperature, °C. | 968 | 968 | 968 | 968 |
| Life Test, % Failures[3] | 60 | 11 | 26 | 0 |

[1] Milled 16 hrs.
[2] Milled 32 hrs.
[3] 48 hrs., 100 V, 125° C.

The foregoing life test data show that $CdSnO_3$ was effective to improve the results of the life test by substantially reducing the number of capacitor failures.

Examples 21-30

Two further series of compositions were prepared in which the effect of varying dopant concentration upon fired dielectric properties was observed. In the first series (Examples 21-25), the amount of $MnO_2$ was raised from 0.1 to 0.5 and in the second series (Examples 26-30), the amount of CoO was varied from 0.1 to 0.5. Both series of compositions were prepared and evaluated in the same manner as Examples 9-16. The properties of the MLC's made therefrom are shown in Table 5 below:

TABLE 5
EFFECT OF DOPANT CONCENTRATION
ON FIRED DIELECTRIC PROPERTIES

| | Example No. | | | | | |
|---|---|---|---|---|---|---|
| | 21 | | 22 | | 23 | |
| Dielectric Composition | (% weight) | | | | | |
| PbO | 61.8 | 61.8 | 61.6 | 61.6 | 61.6 | 61.6 |
| $MgCO_3$ | 6.5 | 6.5 | 6.5 | 6.5 | 6.5 | 6.5 |
| $TiO_2$ | 11.4 | 11.4 | 11.4 | 11.4 | 11.4 | 11.4 |
| $WO_3$ | 15.8 | 15.8 | 15.8 | 15.8 | 15.7 | 15.7 |
| CoO | — | — | — | — | — | — |
| $MnO_2$ | 0.1 | 0.1 | 0.2 | 0.2 | 0.3 | 0.3 |
| $SrTiO_3$ | 3.0 | 3.0 | 3.0 | 3.0 | 3.0 | 3.0 |
| $ZnTiO_3$ | 0.5 | 0.5 | 0.5 | 0.5 | 0.5 | 0.5 |
| $CdSnO_3$ | 1.0 | 1.0 | 1.0 | 1.0 | 1.0 | 1.0 |
| Firing Temperature, °C. | 968 | 996 | 968 | 996 | 968 | 996 |
| Fired Dielectric Properties | | | | | | |
| K at 25° C. | 8705 | 8782 | 7356 | 7084 | 5744 | 5721 |
| TCC, % ΔC, | | | | | | |
| 10° C. | −4.5 | −1.6 | −3.7 | −2.2 | −0.9 | −5.6 |
| 35° C. | −4.4 | −5.4 | −1.0 | −1.7 | 2.5 | 1.2 |
| 50° C. | −15.9 | −15.5 | −9.0 | −7.7 | 0.8 | −1.5 |
| 85° C. | −39.0 | −39.0 | −30.5 | −27.6 | −20.8 | −16.4 |
| % DF (IV/mil) | 1.90 | 1.78 | 0.63 | 0.59 | 0.42 | 0.64 |
| IR (ΩF) | | | | | | |
| 25° C. | 63K | 2.8K | 15K | 2.2K | ∞ | 1.6K |
| 85° C. | 4K | 14K | 3K | 6.7K | ∞ | 2.9K |

| | Example No. | | | | | |
|---|---|---|---|---|---|---|
| | 24 | | 25 | | 26 | |
| Dielectric Composition | (% weight) | | | | | |
| PbO | 61.6 | 61.6 | 61.5 | 61.5 | 61.8 | 61.8 |
| $MgCO_3$ | 6.5 | 6.5 | 6.5 | 6.5 | 6.5 | 6.5 |
| $TiO_2$ | 11.3 | 11.3 | 11.3 | 11.3 | 11.4 | 11.4 |
| $WO_3$ | 15.7 | 15.7 | 15.7 | 15.7 | 15.8 | 15.8 |
| CoO | — | — | — | — | 0.1 | 0.1 |
| $MnO_2$ | 0.4 | 0.4 | 0.5 | 0.5 | — | — |
| $SrTiO_3$ | 3.0 | 3.0 | 3.0 | 3.0 | 3.0 | 3.0 |
| $ZnTiO_3$ | 0.5 | 0.5 | 0.5 | 0.5 | 0.5 | 0.5 |
| $CdSnO_3$ | 1.0 | 1.0 | 1.0 | 1.0 | 1.0 | 1.0 |
| Firing Temperature, °C. | 968 | 996 | 968 | 996 | 968 | 996 |
| Fired Dielectric Properties | | | | | | |
| K at 25° C. | 5144 | 5105 | 4024 | 4630 | 9736 | 8496 |
| TCC, % ΔC, | | | | | | |
| 10° C. | −7.0 | −9.9 | −8.1 | −10.3 | −2.9 | −4.9 |
| 35° C. | 6.0 | 3.5 | 6.9 | 3.8 | −7.1 | −5.0 |
| 50° C. | 6.3 | 3.6 | 8.9 | 4.3 | −19.9 | −14.1 |
| 85° C. | −9.3 | −11.0 | −3.7 | −8.1 | −41.2 | −34.7 |
| % DF (IV/mil) | 0.52 | 0.37 | 0.70 | 0.49 | 1.82 | 2.48 |
| IR (ΩF) | | | | | | |
| 25° C. | 1.3K | 0.9K | 0.9K | 0.6K | 83K | 3.8K |
| 85° C. | 1.1K | 1.3K | 0.6K | 0.6K | 7K | ∞ |

TABLE 5-continued
EFFECT OF DOPANT CONCENTRATION
ON FIRED DIELECTRIC PROPERTIES

| | Example No. | | | |
|---|---|---|---|---|
| | 27 | | 28 | |
| Dielectric Composition | (% weight) | | | |
| PbO | 61.6 | 61.6 | 61.6 | 61.6 |
| $MgCO_3$ | 6.5 | 6.5 | 6.5 | 6.5 |
| $TiO_2$ | 11.4 | 11.4 | 11.4 | 11.4 |
| $WO_3$ | 15.8 | 15.8 | 15.7 | 15.7 |
| CoO | 0.2 | 0.2 | 0.3 | 0.3 |
| $MnO_2$ | — | — | — | — |
| $SrTiO_3$ | 3.0 | 3.0 | 3.0 | 3.0 |
| $ZnTiO_3$ | 0.5 | 0.5 | 0.5 | 0.5 |
| $CdSnO_3$ | 1.0 | 1.0 | 1.0 | 1.0 |
| Firing Temperature, °C. | 968 | 996 | 968 | 996 |
| Fired Dielectric Properties | | | | |
| K at 25° C. | 5809 | 7633 | 8757 | 7417 |
| TCC, % ΔC, | | | | |
| 10° C. | −1.3 | −7.0 | −0.6 | −5.2 |
| 35° C. | −5.8 | −3.0 | −6.4 | −3.5 |
| 50° C. | −18.8 | 11.5 | −18.4 | −11.8 |
| 85° C. | −39.8 | −34.2 | −36.9 | −31.8 |
| % DF (IV/mil) | 1.18 | 2.00 | 1.08 | 1.57 |
| IR (ΩF) | | | | |
| 25° C. | 5.5K | 2.5K | 11.9K | 2.2K |
| 85° C. | 12K | 3.5K | 0.5K | 0.4K |

| | Example No. | | | |
|---|---|---|---|---|
| | 29 | | 30 | |
| Dielectric Composition | (% weight) | | | |
| PbO | 61.6 | 61.6 | 61.5 | 61.5 |
| $MgCO_3$ | 6.5 | 6.5 | 6.5 | 6.5 |
| $TiO_2$ | 11.3 | 11.3 | 11.3 | 11.3 |
| $WO_3$ | 15.7 | 15.7 | 15.7 | 15.7 |
| CoO | 0.4 | 0.4 | 0.5 | 0.5 |
| $MnO_2$ | — | — | — | — |
| $SrTiO_3$ | 3.0 | 3.0 | 3.0 | 3.0 |
| $ZnTiO_3$ | 0.5 | 0.5 | 0.5 | 0.5 |
| $CdSnO_3$ | 1.0 | 1.0 | 1.0 | 1.0 |
| Firing Temperature, °C. | 968 | 996 | 968 | 996 |
| Fired Dielectric Properties | | | | |
| K at 25° C. | 8222 | 7697 | 8067 | 7383 |
| TCC, % ΔC, | | | | |
| 10° C. | −1.0 | −0.9 | −0.5 | −1.8 |
| 35° C. | −6.2 | −4.6 | −5.7 | −3.8 |
| 50° C. | −17.8 | 12.8 | −17.2 | −11.7 |
| 85° C. | −37.6 | −32.2 | −37.8 | −30.8 |
| % DF (IV/mil) | 0.76 | 0.96 | 0.91 | 1.39 |
| IR (ΩF) | | | | |
| 25° C. | 1.9K | 0.5K | 0.5K | 0.2K |
| 85° C. | 0.1K | 0.1K | 0.1K | 0.1K |

Examples 31-39

A still further series of nine compositions was prepared in which minor variations were made in the content of $WO_3$, $MgCO_3$, PbO and $TiO_2$. In particular, two compositions were prepared in which each of the above-referred four components was present in excess or in deficiency. Each of the compositions and a control were used to prepare MLC's in the manner described above using firing temperatures of 996° C. and 1024° C. The dielectric composition and properties of the MLC's made therefrom are given in Table 6 below:

TABLE 6
EFFECT OF VARIATIONS IN
COMPOSITION OF MAJOR COMPONENTS

| | Example No. | |
|---|---|---|
| | 31 | 32 |

TABLE 6-continued
EFFECT OF VARIATIONS IN COMPOSITION OF MAJOR COMPONENTS

| Dielectric Composition | (% weight) | | | |
|---|---|---|---|---|
| PbO | 61.4 | | 62.0 | |
| MgCO$_3$ | 6.6 | | 6.6 | |
| TiO$_2$ | 11.1 | | 11.1 | |
| WO$_3$ | 15.9 | | 15.1 | |
| TMO* | 1.5 | | 1.5 | |
| ZnTiO$_3$ | 0.5 | | 0.5 | |
| SrTiO$_3$ | 3.0 | | 3.0 | |
| Condition | Control | | WO$_3$ | Deficient |
| Firing Temperature, °C. | 968 | 1024 | 996 | 1024 |
| Fired Dielectric Properties | | | | |
| K at 25° C. | 8609 | 9410 | 10711 | 8964 |
| % DF (1V/mil) | 0.66 | 1.21 | 0.85 | 3.07 |
| TCC, % ΔC, | | | | |
| 10° C. | +8.6 | −2.8 | −29.1 | +1.6 |
| 35° C. | −7.0 | −4.4 | +10.9 | −2.6 |
| 50° C. | −18.4 | −17.2 | +7.4 | −13.1 |
| 85° C. | −44.3 | −39.9 | −27.1 | −40.1 |
| IR (ΩF) | | | | |
| 25° C. | ∞ | 7.5K | 50K | 2K |
| 85° C. | 2.4K | 2.7K | 6.5K | 0.5K |

| | Example No. | |
|---|---|---|
| | 33 | 34 |
| Dielectric Composition | (% weight) | |
| PbO | 60.8 | 62.2 |
| MgCO$_3$ | 6.5 | 5.8 |
| TiO$_2$ | 11.0 | 11.1 |
| WO$_3$ | 16.7 | 15.9 |
| TMO* | 1.5 | 1.5 |
| ZnTiO$_3$ | 0.5 | 0.5 |
| SrTiO$_3$ | 3.0 | 3.0 |
| Condition | WO$_3$ Excess | MgCO$_3$ Deficient |
| Firing Temperature, °C. | 996 1024 | 996 1024 |
| Fired Dielectric Properties | | |
| K at 25° C. | 8747 4131 | 2745 3292 |
| % DF (1V/mil) | 1.26 1.80 | 1.72 2.28 |
| TCC, % ΔC, | | |
| 10° C. | −18.5 −19.0 | −53.1 −24.7 |
| 35° C. | −0.6 +25.0 | +83.1 +28.3 |
| 50° C. | −11.6 +70.7 | +62.5 +59.8 |
| 85° C. | −39.0 +41.0 | +43.8 +54.7 |
| IR (ΩF) | | |
| 25° C. | 2.3K 0.8K | 1.5K 1.5K |
| 85° C. | 1.5K 1.6K | 1.3K 2K |

| | Example No. | |
|---|---|---|
| | 35 | 36 |
| Dielectric Composition | (% weight) | |
| PbO | 60.6 | 60.6 |
| MgCO$_3$ | 7.4 | 6.7 |
| TiO$_2$ | 11.1 | 11.4 |
| WO$_3$ | 15.9 | 16.3 |
| TMO* | 1.5 | 1.5 |
| ZnTiO$_3$ | 0.5 | 0.5 |
| SrTiO$_3$ | 3.0 | 3.0 |
| Condition | MgCO$_3$ Excess | PbO Deficient |
| Firing Temperature, °C. | 996 1024 | 996 1024 |
| Fired Dielectric Properties | | |
| K at 25° C. | 10,306 | 4304 2843 |
| % DF (1V/mil) | 1.67 | 1.55 2.38 |
| TCC, % ΔC, | | |
| 10° C. | −8.1 | −31.3 −14.8 |
| 35° C. | −1.9 | +46.3 +16.2 |
| 50° C. | −15.2 | +84.9 +45.4 |
| 85° C. | −44.5 | +41.8 +127.5 |
| IR (ΩF) | | |
| 25° C. | 3K | 0.9K 0.9K |
| 85° C. | 1K | 1.9K 1.3K |

| | Example No. | |
|---|---|---|
| | 37 | 38 |
| Dielectric Composition | (% weight) | |
| PbO | 62.1 | 62.0 |
| MgCO$_3$ | 6.4 | 6.6 |
| TiO$_2$ | 10.9 | 10.3 |
| WO$_3$ | 15.6 | 16.3 |
| TMO* | 1.5 | 1.5 |
| ZnTiO$_3$ | 0.5 | 0.5 |
| SrTiO$_3$ | 3.0 | 3.0 |
| Condition | PbO Excess | TiO$_2$ Deficient |
| Firing Temperature, °C. | 996 1024 | 996 1024 |
| Fired Dielectric Properties | | |
| K at 25° C. | 7465 8078 | 5699 6850 |
| % DF(1V/mil) | 0.74 2.00 | 0.26 1.00 |
| TCC, % ΔC, | | |
| 10° C. | −0.3 −19.9 | +6.6 −0.4 |
| 35° C. | −4.4 +6.3 | −7.6 −5.2 |
| 50° C. | −12.8 −1.5 | −16.9 −16.4 |
| 85° C. | −34.3 −30.1 | −37.1 −39.1 |
| IR (ΩF) | | |
| 25° C. | ∞ 3.3K | ∞ ∞ |
| 85° C. | 6.4K 6.4K | ∞ 2.8K |

| | Example No. |
|---|---|
| | 39 |
| Dielectric Composition | (% weight) |
| PbO | 60.7 |
| MgCO$_3$ | 6.5 |
| TiO$_2$ | 12.0 |
| WO$_3$ | 15.8 |
| TMO* | 1.5 |
| ZnTiO$_3$ | 0.5 |
| SrTiO$_3$ | 3.0 |
| Condition | TiO$_2$ Excess |
| Firing Temperature, °C. | 996 1024 |
| Fired Dielectric Properties | |
| K at 25° C. | 951 1024 |
| % DF (1V/mil) | 1.22 4.52 |
| TCC, % ΔC, | |
| 10° C. | −7.4 −5.2 |
| 35° C. | +5.9 +5.0 |
| 50° C. | +15.9 +12.7 |
| 85° C. | +52.0 +33.1 |
| IR (ΩF) | |
| 25° C. | 0.9K ∞ |
| 85° C. | 2.9K 0.6K |

*TMO — Transition metal oxides consisting by weight of 5% MnO$_2$, 15% CoO and 80% PbTiO$_3$.

The above data show that small amounts of metal oxides can have a very beneficial effect in lowering the DF characteristics of the basic material system.

I claim:

1. A composition for forming a densified dielectric body at low firing temperatures comprising a mixture of finely divided particles consisting essentially of (a) 95.5–99.4% wt. of a mixture of metal oxide, metal oxide precursors of polynary oxide reaction products thereof in molar proportions corresponding to the formula:

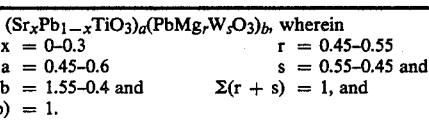

$(Sr_xPb_{1-x}TiO_3)_a(PbMg_rW_sO_3)_b$, wherein
$x = 0-0.3$ $r = 0.45-0.55$
$a = 0.45-0.6$ $s = 0.55-0.45$ and
$b = 1.55-0.4$ and $\Sigma(r + s) = 1$, and
$\Sigma(a + b) = 1$.

(b) 4.5–0.6% wt. of a mixture of metal oxides or precursors thereof consisting essentially of (1) 0.1–1.0% wt. of a binary oxide of a transition metal selected from the group consisting of Co, Ni, Cr, Mn and mixtures thereof, (2) 0.25–1.5% wt. of Cd titanate, Zn titanate or mixtures thereof, and (3) 0.25–2.0% wt. of a polynary oxide selected from the group consisting of Cd zirconate, Zn zirconate, Cd stannate, Zn stannate and mixtures thereof, substantially all the particles being less than 10 μm in largest dimension and having a surface area of at least 0.5 m²/g.

2. The composition of claim 1 in which a major proportion of the components have been calcined.

3. The composition of claim 2 in which the (a) components have been calcined in air.

4. The composition of claim 1 in which (a) is 0.5–0.55 and (b) is 0.5–0.45.

5. The composition of claim 1 in which the titanate (2) of component (b) is $ZnTiO_3$.

6. The composition of claim 1 in which the polynary oxide (3) of component (b) is $CdSnO_3$.

7. The composition of claim 1 in which the binary metal oxides of (b) are 0.05–0.5% by weight each of $MnO_2$ and $CoO$.

8. The composition of claim 1 formed from the following metal oxides in the indicated weight proportions:
PbO: 60.6
$MgCO_3$: 6.5
$TiO_2$: 11.0
$WO_3$: 15.7
$SrTiO_3$: 3.25
$MnO_2$: 0.07
$CoO$: 0.22
$PbTiO_3$: 1.2
$ZnTiO_3$: 0.5
$CdSnO_3$: 1.0.

9. The composition of claim 1 in which the mixture of finely divided solids is dispersed in an organic medium comprising a polymeric binder dissolved in organic solvent.

10. The composition of claim 9 in which the organic solvent is a volatile nonaqueous solvent and the dispersion is of castable consistency.

11. A dielectric green tape comprising a layer of the composition of claim 10 from which the volatile solvent has been removed.

12. The composition of claim 9 in which the organic solvent is a solution comprising a resin and thixotropic agent dissolved in a solvent having a boiling point of 130°–350° C. and the dispersion is of paste consistency suitable for screen printing.

* * * * *